United States Patent [19]

Dartois

[11] 4,049,923

[45] Sept. 20, 1977

[54] SWITCHING NETWORK EMPLOYING AN IMPROVED INTERCONNECTION

[75] Inventor: Jean-Pierre André Dartois, Paris, France

[73] Assignee: International Standard Electric Corporation, New York, N.Y.

[21] Appl. No.: 627,578

[22] Filed: Oct. 31, 1975

Related U.S. Application Data

[63] Continuation of Ser. No. 402,767, Oct. 2, 1973, abandoned.

[30] Foreign Application Priority Data

Oct. 27, 1972   France ................................ 72.38126

[51] Int. Cl.² ............................................ H04Q 1/16
[52] U.S. Cl. ........................ 179/18 GE; 179/18 AG; 179/98
[58] Field of Search ................................... 179/18 GE

[56] References Cited

U.S. PATENT DOCUMENTS 3,763,325  10/1973  Kapel et al. ............................. 179/98

Primary Examiner—Kathleen H. Claffy
Assistant Examiner—C. T. Bartz
Attorney, Agent, or Firm—J. B. Raden; M. M. Chaban

[57] ABSTRACT

A switching network is disclosed which employs a simplified distributing frame to interconnect line selection units and group selection units. An intergroup trunking formula using multibit designations for each terminal is employed as a guide in forming the distributing frame. The system permits intermediate access to the network at the link-terminals by way of loop circuits coupled to the distributing frame. The use of distributing frame according to the invention enables the use of plug-in modular wiring.

4 Claims, 9 Drawing Figures

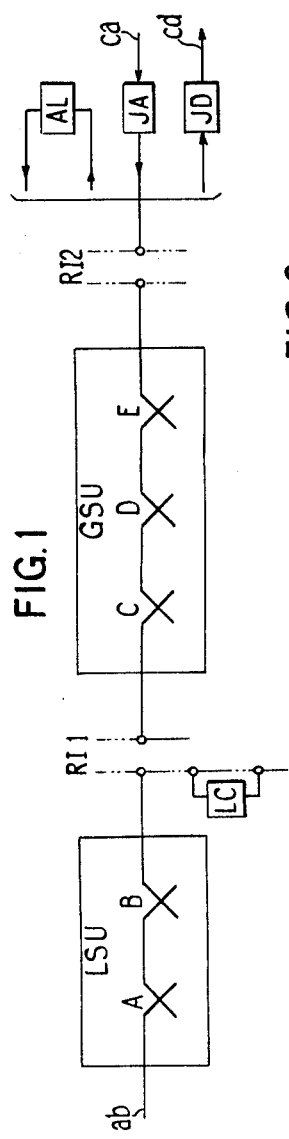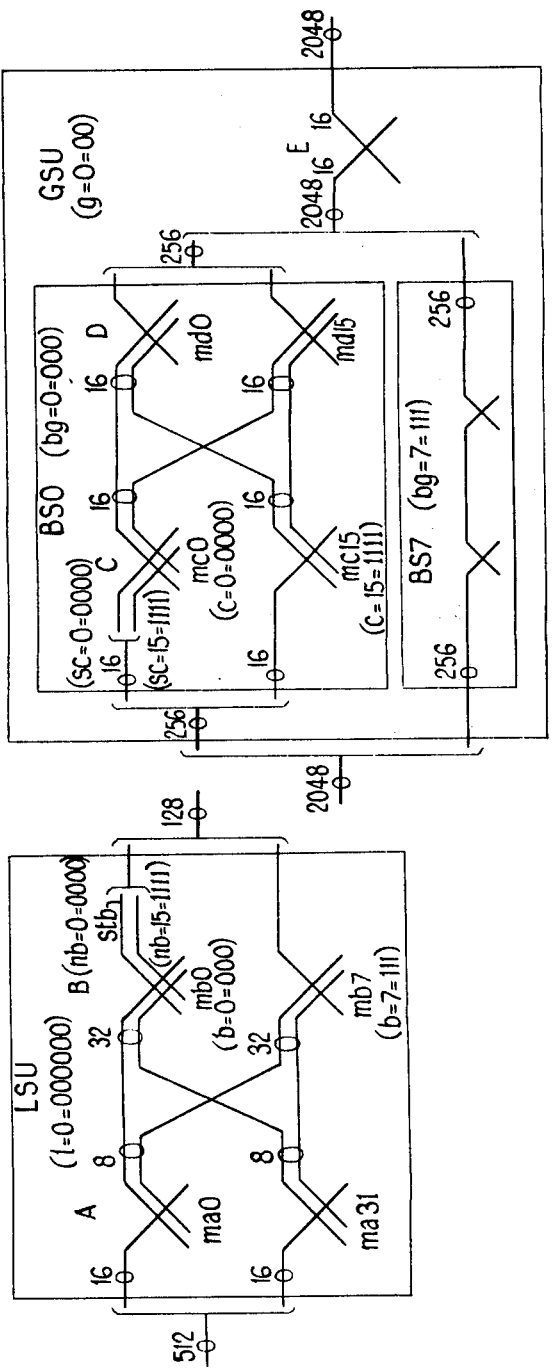

| 0 | | | $l_5$ | $l_4$ | $l_3$ | $l_2$ | $l_1$ | $l_0$ | $b_2$ | $b_1$ | $b_0$ | $nb_3$ | $nb_2$ | $nb_1$ | $nb_0$ |
|---|---|---|---|---|---|---|---|---|---|---|---|---|---|---|---|
| 1 | 8 LSU | | | | | $sc_2$ | $sc_1$ | $sc_0$ | $sc_3$ | $c_1$ | $c_0$ | $c_2$ | $bg_1$ | $bg_0$ | $c_3$ |
| 2 | 16 LSU | | | | $sc_3$ | $sc_2$ | $sc_1$ | $sc_0$ | $c_2$ | $c_1$ | $c_0$ | $bg_2$ | $bg_1$ | $bg_0$ | $c_3$ |
| 3 | 32 LSU | | | $c_3$ | $sc_3$ | $sc_2$ | $sc_1$ | $sc_0$ | $c_2$ | $c_1$ | $c_0$ | $bg_0$ | $bg_1$ | $g_0$ | $bg_2$ |
| 4 | 64 LSU | | $c_2$ | $c_3$ | $sc_3$ | $sc_2$ | $sc_1$ | $sc_0$ | $bg_2$ | $c_1$ | $c_0$ | $bg_0$ | $bg_1$ | $g_0$ | $g_1$ |

SWITCHING NETWORK EMPLOYING AN IMPROVED INTERCONNECTION

This is a continuation of application Ser. No. 402,767 filed Oct. 2, 1973, now abandoned.

BACKGROUND OF THE INVENTION

1. Field of the Invention

The present invention concerns improvements to switching networks and, more particularly, to improvements in switching networks employing several stages of switching matrices such as those used in space switching telephone or telegraph exchanges.

2. Description of the Prior Art

A switching matrix has a first group of accesses which arbitrarily may be called inputs, a second group of accesses which may be called outputs and a plurality of crosspoint contacts between the accesses. The crosspoints make it possible to connect each input to all or some outputs and each output to all or some inputs.

A switching network comprising several selection stages has also inputs and outputs, and it is constituted by an arrangement of interconnected matrices. In a general way, the network inputs are connected to the inputs of a certain number of matrices constituting a first selection stage. The outputs of the first stage matrices are connected each by a "link" to the inputs of a certain number of matrices constituting a second selection stage. Similarly, the outputs of the second stage matrices are connected to the inputs of the third stage matrices, and so on. The network outputs are connected to the outputs of the last stage matrices.

Such an arrangement not only enables the connection from a network input to any network output, by a connection path including a matrix of each stage and the corresponding links between stages, but also offers between the considered input and output, the greatest possible number of separate connection paths, in order to have the greatest possibility of satisfying any connection request, and, finally, in that the network handles the traffic in the best conditions.

Such traffic considerations would lead to distribute outputs of each matrix of any stage on all the inputs of the next stage and, reciprocally, to distribute the inputs of each matrix of this next stage on all the outputs of the first considered stage, performing what will be called a general grading. However, experience and calculation have shown that such a general grading was not necessary for all the network stages. The switching networks are therefore generally constituted from selection units.

A selection unit includes a defined number of first stage matrices, a defined number of second stage matrices and links, interconnecting, inside the selection unit, the outputs of the first stage matrices to the inputs of the second stage matrices. In this case, a two-stage selection unit is concerned. In the same way, a selection unit with three stages or more may be designed.

A four-stage switching network may thus be composed of two-stage line selection units constituting the first two stages of the network, then of two-stage group selection units constituting the last two stages of the network. An example of such a switching network is described in the paper "Pentaconta Dial Telephone Switching System" of the "Electrical Communication" American revue of June, 1954.

An advantage of such a design is that switching networks of increasing dimensions can be built by merely adding standard selection units and that, particularly, it avoids any modification of the existing selection units when extending the network. However, it is necessary that there subsists a general grading between the outputs of the line selection units and the inputs of the group selection units. Indeed, it is preferable that the outputs of a line selection unit matrix be connected to the different group selection units and that the inputs of a group selection unit matrix be connected to the different line selection units. This general grading is defined for each network and must be modified when an extension is made.

A general grading of such type as described above is usually done by means of an intermediate distributing frame. The outputs of the previous stage are connected to tags "outputs" of the intermediate distributing frame. The inputs of the next stage are connected to tags "inputs." A removable wiring connects each "output" to each "input," in order to carry out the grading provided in each application. This wiring is modified and completed when an extension is made.

However, French patent application No. 70 11616, filed on Apr. 1, 1970 by the applicant, for "Improvements to switching networks" and published in France as Pat. No. 2,086,535, corresponding to U.S. Pat. No. 3,710,030, issued Jan. 9, 1973 provides the means of distributing the outputs of the line selection elements into output groups, of distributing the inputs of the group selection units into input groups, and carrying out a general grading between the line selection unit outputs and group selection unit inputs, whatever may be the network dimensions, by connecting the output groups to the input groups by means of plug-in cables associating each group of outputs to a group of inputs.

SUMMARY OF THE INVENTION

The present invention enables avoidance of the use of a conventional intermediate distributing frame, substituting therefor a simplified distributing frame. When an extension is being made, the arrangement of cables between output groups and input groups is re-adapted and completed.

This is obtained in designating each output by a set of numbers of the type:

$$B_j \ldots B_{f+1}, B_f \ldots B_0 \qquad (a)$$

wherein $B_j \ldots B_{f+1}$ are the digits of the number of a line selection unit; and, $B_f \ldots B_0$ are the digits of the output number in the line selection unit.

Likewise, each input is designated by a set of numbers of the type:

$$C_n \ldots C_{g+1}, C_g \ldots C_O \qquad (b)$$

wherein $C_n \ldots C_{g+1}$ are a digits of the number in the group selection unit and $C_g \ldots C_O$ are the digits of the input number in the group selection unit.

The general grading is obtained by connecting one to the other an output and an input, whose sets of numbers are related by a relation of the type:

$$(B_j \ldots B_{f+1}, B_f \ldots B_0) = (C_n \ldots C_{g+1}, C_g C_O) \qquad (c)$$

so that to each digit of the left part — that is of the output number — corresponds a digit of the right part — that is of the input number — the correspondence law, or relationships between the digits, varying according to the application and, namely, according to the switching network dimensions; and are also related by a relation of the type:

$$(B_u, B_v) = (C_x, C_y) \qquad (d)$$

so that to certain digits of the output number always correspond certain digits of the input number, whatever the grading is, which allows the constitution of output groups and input groups and the connection of the outputs to the inputs by identical groups in all cases; only the correspondence law between the groups varying according to the application and being alone modified in the case of extension.

Indeed, whatever be the network's dimensions, the outputs whose numbers are differentiated only by the values of digits $B_u$ and $B_v$, constitute a group and are connected to a group of inputs whose numbers are differentiated only by the values of digits $C_x$ and $C_y$.

Moreover, the switching network is built in equipment units (racks or sub-racks) and a line selection equipment unit contains outputs whose numbers are differentiated only by the digits in the set of numbers:

$$B_i \ldots B_{f+1}, B_f \ldots B_O \qquad (e)$$

of the previous set of numbers ($a$); likewise, a group selection equipment unit contains inputs whose numbers are differentiated only by the digits in the set of numbers:

$$C_m \ldots C_{g+1}, C_g \ldots C_O \qquad (f)$$

of the previous set of numbers ($b$). It is then provided that, in a first form of embodiment, the digits concerned by the relation ($d$) defining the composition of the output and input groups will be chosen among the digits of the expressions ($c$) and ($f$) respectively, so that the constitution of these groups should take place inside each equipment unit, which will make it possible to design equipment units, all identical, for each stage, and, having a wiring independent of the other units of the stage.

moreover, in a second form of embodiment, the present invention provides for the realization of output groups (inputs) belonging to different equipment units; and to that end, to realize provisional output groups (inputs) in each equipment unit and to connect these provisional groups to a simplified distributing frame module by means of which the links of several provisional groups are redistributed in order to constitute several output groups (inputs) satisfying the relation ($d$). Thus, the links of a provisional grouping of outputs, for instance, are distributed by the module of the simplified distributing frame onto various output groups and, consequently, onto corresponding various input groups. In this case, the connection of the provisional output groups (inputs) to the simplified distributing frame will be done by means of plug-in cables as well as connection of the output groups, constituted by the simplified distributing frame, to the input groups (outputs) while the simplified distributing frame, whose only function is to redistribute arrangements of provisional groups into output groups (inputs), will have a regular structure and can be wired in the factory.

The present invention, in a network of the type just described above, and object of U.S. Pat. No. 3,710,030, already mentioned, concerns the designing of "loop circuits" used for transit calls. Indeed, the incoming and outgoing circuits are connected to the outputs of the network, that is to say to outputs of the group selection units. A transit call requires the connection one to each other of two outputs of the network. It is well known to provide, to that end, links which connect one to each other two inputs of the group selection units; this being so-called a loop circuit. A transit call is then set up by: an incoming junctor, the corresponding output of a group selection unit, a connection path in that unit, an input of that unit associated, through a loop circuit, with an input of another group selection unit, or of the same unit, a connection path in that other unit, an output of that other unit, and, an outgoing junctor.

To respond to the different transit call cases, the loop circuits have to interconnect input couples belonging to one same group selection unit as much as to any possible couple of these units.

Since the patent just mentioned above accounts for the removal of the conventional distributing frame and provides for only a simplified distributing frame, it is worth being able to realize loop circuits with the help of the simplified distributing frame only, without any additional means. It being the object of the present invention.

According to a first feature of present invention, the connection network having cables between line and group selection units such as is defined by the expressions ($a$) and ($b$) associated by the foregoing relations ($c$) and ($d$), which determines output groups and input groups connected by means of plug-in cables, and the output groups being made up by means of simplified distributing frame modules which distribute the links originating from several output provisional groupings in order to form several output groups, it is provided to constitute the output provisional groupings by means of links distinguished among them, partly by digits which are associated, according to relation ($c$), with digits $C_n$ . . . $C_{g+1}$ of the expression ($b$); that is to say that the links of one same provisional grouping lead onto the various group selection units, so that it is possible to constitute all the necessary loop circuits by interconnecting two by two links wich belong to one same provisional output grouping.

BRIEF DESCRIPTION OF THE DRAWINGS

Different other features of the invention will become apparent from the description that follows, given by way of non-limiting example, in conjunction with the accompanying drawings comprising:

FIG. 1, a diagram showing the general organization of a telephone exchange to which the present invention may be applied;

FIG. 2, the diagram of an embodiment of a line selection unit (LSU) of the exchange in FIG. 1;

FIG. 3, the diagram of an embodiment of a group selection unit (GSU) of the exchange in FIG. 1;

DESCRIPTION OF A PREFERRED EMBODIMENT

Figures 4, 5:
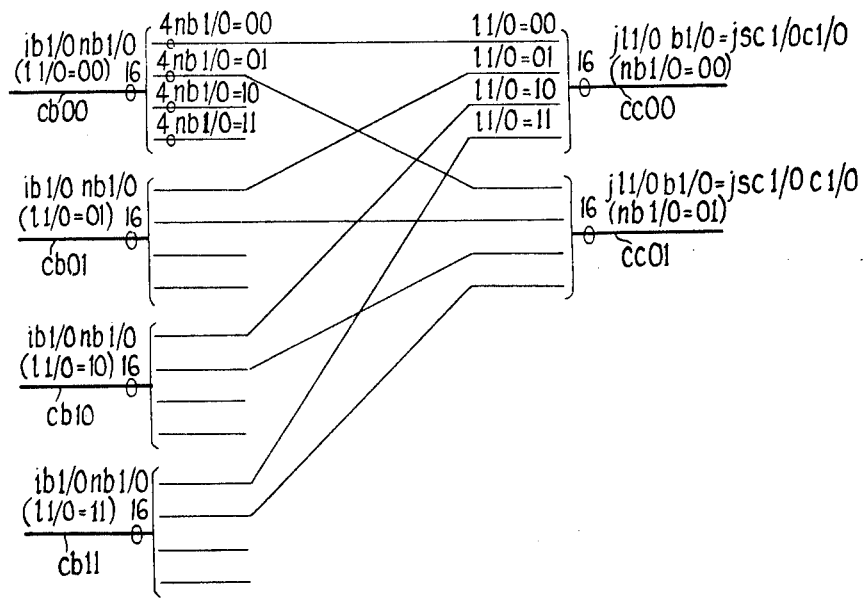
FIG. 4, a table giving different equations defining, according to the invention, the wiring between the selection stages B and C of the exchange in FIG. 1.
FIG. 5, an embodiment of the wiring between stages B and C of the exchange in FIG. 1, according to the equations of FIG. 4.

First will be described, referring to FIG. 1, the general organization of a telephons exchange to which may be applied the present invention.

This exchange includes:

a switching network with five stages A, B, C, D, E divided into line selection units LSU and into group selection units GSU;

subscribers lines ab connected to the inputs of the line selection units LSU;

loop circuits LC serving to set up transit calls and having two accesses, one for the connection of an incoming circuit originating from another exchange, the other for the connection of an outgoing circuit leading onto another exchange;

an intermediate distributing frame RI1 making it possible to connect the outputs of the line selection units LSU and the accesses of the loop circuits LC to the inputs of the group selection units GSU;

local junctors AL having two accesses, one for the connection of a calling subscriber's line, the other for the connection of a called subscriber's line, and serving to set up calls between the exchange subscribers;

outgoing junctors JD having an access for the connection of a calling subscriber's line and equipping outgoing circuits cd leading to other exchanges with the view to setting up outgoing calls;

incoming junctors JA equipping incoming circuits ca originating from other exchanges and having an access for the connection of a called subscriber's line, with the view to setting up incoming calls;

an intermediate distributing frame RI2 making it possible to connect the junctor accesses to the outputs of the group selection units.

The organization and the general operation of such an exchange are well known in the art.

A calling subscriber's line, after having transmitted the called number to non-represented control apparatus, is connected, via a line selection unit LSU and a group selection unit GSU, either to an access of one of the local junctors AL, with the view to setting up a call with another subscriber of the exchange, or to the access of one of the outgoing junctors JD, with the view to setting up a call with a subscriber of another exchange.

A called subscriber's line is connected, in the same way, either to an access of one of the local junctors AL, if the call is originated from another subscriber of the exchange or to the access of one of the incoming junctors JA, if the call is originated from a subscriber of another exchange.

In the case of a transit call, one of the accesses of a loop circuit LC is connected to the access of one of the incoming junctors JA and the other access of the loop circuit LC is connected to the access of one of the outgoing junctors JD. The call is therefore set up by means of an incoming junctor, a path through a group selection unit GSU, a loop circuit LC, another path through a group selection unit GSU and an outgoing junctor.

Now will be described, in referring to FIG. 2, an embodiment of the line selection units LSU of FIG. 1.

The selection unit of FIG. 2 is constituted by 32 matrices ma0 to ma31, belonging to the selection stage A (matrices A), and by 8 matrices mb0 to mb7, belonging to the selection stage B (matrices B).

To the inputs of each matrix A are connected 16 subscriber's lines, that is a total of 512 lines for the selection unit.

Each matrix A has 8 outputs each connected by a link to one input of the matrices B.

To each matrix B are connected 32 links each originating from one of the matrices A.

Each matrix B has 16 outputs, such as stb; that is a total of 128 outputs for the line selection unit.

Each input of the line selection unit can be connected to each output by one single connection path using the link connecting the matrix A, to which the input belongs, to the matrix B to which the output belongs.

In FIG. 2, the number b of each matrix B has been indicated with its value in decimal form and then with its value in binary form. The matrices B bear binary numbers from 000 to 111.

Similarly, the numbers nb of the outputs of a matrix B (mb0) are indicated in decimal and binary form. It can be seen that the outputs of the matrices B bear numbers from 0000 to 1111.

Finally, the exchange of FIG. 1 includes a certain number of line selection units such as those of FIG. 2. Each of them will bear a number l and FIG. 2 represents the unit bearing the number 0, that is 000000 in binary notation, in a system which may have up to 64 line selection units.

An output of stage B (FIG. 1) is thus finally identified by:

its rank in a matrix, defined by the number $nb$ including, in binary notation, 4 digits which will be referenced $nb_3, nb_2, nb_1, nb_0$ — or, $nb_{3/0}$;

The rank of the matrix in a line selection unit, defined by the number $b$ including 3 binary digits which will be so-called $b_{2/0}$;

the rank of the line selection unit, defined by the number l including, for instance, 6 binary digits which will be so-called $l_{5/0}$;

By juxtaposing these numbers, the number of an output of stage B (output B) is obtained:

$$l_5\, l_4\, l_3\, l_2\, l_1\, l_0,\ b_2\, b_1\, b_0,\ nb_3\, nb_2\, nb_1\, nb_0 \tag{1}$$

The loop circuits are grouped into packets of 64 (for instance), equivalent each to a line selection unit. Each packet is identified by a number whose size $l_{5/0}$ is the same as that of the line selection units. The 128 accesses of a packet of loop circuits can be numbered as outputs of a line selection unit by applying the expression (1) above. There follows an equivalence and, after which, an interchangeability between packets of loop circuits and line selection units.

An embodiment of the group selection units GSU of FIG. 1 is represented in FIG. 3. The group selection unit is constituted by selection blocks such as BS0 and BS7, associated by matrices of the selection stage E.

A selecton block includes 16 matrices, mc0 to mc15, belonging to stage C (matrices C), each having 16 inputs and 16 outputs, and 16 matrices, md0 to md15, belonging to stage D (matrices D), each also having 16 inputs and 16 outputs. A link connects an output of each matrix C to an input of each matrix D, in the same way as in a line selection unit. Thus a selection block has a total of 256 inputs and 256 outputs. Each input of the block can be connected to each output by one single connection path using the link connecting the matrix C, to which belongs the input, to the matrix D, to which belongs the output.

The stage E is constituted by matrices with 16 inputs and 16 outputs (matrices E). The number of matrices E is the same as the total number of matrices D in the different selection blocks.

To the outputs of the matrices E are connected, as indicated by FIG. 1, the acesses of the different junctors via the intermediate distributing frame RI2.

A complete group selection unit includes 8 selection blocks and 8 × 16 matrices E. The network may include 1, 2 or 4 group selection units. In smaller exchanges, there will be only a partial group selection unit constituted by 2, 4 or 8 selection blocks and an appropriate number of matrices E.

As for the outputs of the line selection unit of FIG. 2, there has been indicated in FIG. 3 the numbers sc of the inputs of a matrix C (mc0), with their values in decimal notation and binary notation, as well as the numbers c of the matrices C in one block, the numbers bg of the blocks and the number g of the group selection unit. To these numbers correspond binary digits to which will be respectively given the references: $sc_{3/0}$, $c_{3/0}$, $bg_{2/0}$, $g_{1/0}$. Finally, the number of an input of stage C (input C) is:

$$g_1, g_0, bg_2 bg_1 bg_0, c_3 c_2 c_1 c_0, sc_3 sc_2 sc_1 sc_0 \quad (2)$$

The present invention concerns in a general way the stage interconnections in a connection network and, more particularly, in the described application by referring to FIGS. 1, 2 and 3, the interconnections between the selection stages B and C, that is between, on the one hand, the line selection units and the loop circuits LC, and, on the other hand, the one or several group selection units.

As far as possible, the outputs of a matrix of stage B must be distributed on:

the different group selection units;
the different selection blocks of the group selection units;
the different matrices of the selection blocks.

Reciprocally, the inputs of each matrix of stage C must be distributed on:

the different line selection units;
the different matrices of the line selection units.

These considerations apply also with respect to the loop circuits essentially for homogeneousness purposes.

In other terms, a grading as general as possible must be carried out between the outputs of stage B and the inputs of stage C.

According to U.S. Pat. No. 3,710,030, already mentioned above, for a given capacity of the switching network, the connections between stages B and C are defined by a grading equation characterizing an equality between each digit of the number of an output B and one of the digits of the number of an input C. This equation thus defines the number of the input C to which must be connected each output B.

For example, in a switching network constituted by 64 line selection units only, an equation of this type will be:

$$[l_5 l_4 l_3 l_2 l_1 l_0, b_2 b_1 b_0, nb_3 nb_2 nb_1 nb_0] = [c_2 c_3 sc_3 sc_2 \\ sc_1 sc_0, bg_2 c_1 c_0, bg_0 bg_1 g_0 g_1] \quad (3)$$

This equation means that, in the numbers of an output B and of an input C to be interconnected, the digits $l_5$ and $c_2$ are equal, as $l_4$ and $c_3$, etc., up to $nb_0 = g_1$. It may be applied to any link but is only valid for an exchange having 64 line selection units and 4 group selection units.

As it can be seen by examining the equation (3), the 16 outputs of a matrix of stage B, differentiated by the value of the digits $nb_{3/0}$, are equally distributed on the four group selection units ($g_1 = 0$ or 1, according to $nb_0$) and ($g_0 = 0$ or 1, according to $nb_1$); the 4 outputs B going to one group selection unit are connected to 4 different blocks ($bg_0 bg_1 = nb_3 nb_2$), at the rate of one output B per block.

Likewise, the 16 inputs of a matrix C, differentiated by the value of digits $sc_{3/0}$, are distributed on 16 line selection units ($l_3 l_2 l_1 l_0 = sc_3 sc_2 sc_1 sc_0$).

FIG. 4 represents, in the form of a table, four equations corresponding to four different capacities of the switching network, the line 0 representing the digits of the number of the outputs B, whereas each of the lines 1 to 4 represents the digits of the number of an input C, in the four network capacities, the digits placed on a same vertical line being equal.

The lines 0 and 1 of the table in FIG. 4 correspond to the case of a switching network having eight line selection units (8 LSU); the lines 0 and 2 to 4 respectively correspond to networks having 16, 32 and 64 line selection units (16 to 64 LSU).

In fact, it is here an example of application of present invention, and the indicated capacities (8 to 64 LSU) are maximum capacities in each case; intermediate capacities may be provided without going beyond the scope of the present invention.

In lines 0 and 4, is found the above-described equation (3). The lines 1 to 3 give similar equations, with one more digit when passing from one line to the next line, in order to take into account the capacity doubling.

According to the equation given by the lines 0 and 1, the outputs ($nb_{3/0}$) of a matrix B are distributed on the four selection blocks ($bg_1 bg_0$) and on four matrices C in each of them ($c_3 c_2$). The inputs of a matrix C ($sc_{3/0}$) are distributed on the 8 line selection units ($l_{2/0}$) and on two matrices B ($b_2$) in each of them.

According to the equation of lines 0 and 2, the outputs of a matrix B are distributed on the 8 selection blocks and on two matrices C in each of them. However, the outputs of a line selection unit ($b_{2/0}, nb_{3/0}$) are distributed on all the matrices C ($bg_{2/0}, c_{3/0}$), at the rate of one output per matrix C. The inputs of a matrix C are evenly distributed on the 16 line selection units.

According to the equations of lines 0 and 3, the outputs of a matrix B are distributed on 2 group selection units and on the 8 selection blocks inside each of the grop selection units, whereas the inputs of a matrix C are distributed on 16 line selection units.

In the various cases, it will be noted therefore that the outputs of a line selection unit ($b_{2/0} nb_{3/0}$) are distributed on the greatest possible number of group selection units, of group selection blocks in each group selection unit and of matrices C in each block.

The different equations represented by FIG. 4 and corresponding to the different capacities of a switching network of the type depicted in FIGS. 1 to 3 have all the characteristic of including the equality $l_1 l_0 b_1 b_0 = sc_1 sc_0 c_1 c_0$. This means that to each 16 output group, only differentiated by the different values of digits $l_1 l_0 b_1 b_0$, corresponds a determined group of 16 inputs, of a group selection block, only differentiated by the corresponding values of digits $sc_1 sc_0 c_1 c_0$.

In other terms, on the one hand, the outputs of a selection stage are grouped by $n$ and, on the other hand, the inputs of the next stage are also grouped by $n$, $n = 16$ in the present case, and this whatever the exchange capacity is. The connections between stages can thus be established via link groups each going from one group of outputs B to one group of inputs C.

It is worth noting that the 16 outputs, constituting a group of outputs, belong to four line selection units. Now then, if the matrices B of a line selection unit are assembled in one same equipment unit (sub-racks, for instance), this will require constituting a group of outputs from several equipment units which then would complicate the wiring.

FIG. 5 illustrates therefore how are constituted groups of 16 outputs differentiated by the digits $1_1$, $1_0 b_1$, $b_0$ from provisional groupings of 16 outputs originating each from a line selection units; the 16 outputs of a provisional grouping unit; differentiated by the digits $b_1$, $b_0$, $nb_1$, $nb_0$.

In FIG. 5, the cable $cb00$ includes 16 links associated with 16 outputs of one same line selection unit whose number $1_{1/0}$ has for value 00; the numbers of these outputs comprise a common part $i$ and are differentiated by the digits $b_1$, $b_0$ and $nb_1$, $nb_0$. The cables $cb01$, $cb10$ and $cb11$ thus include each 16 links associated with 16 outputs of the same rank as those of cable $cb00$, but are respectively originated from the three next line selection units whose digits $1_{1/0}$ have respectfully the values 01, 10, 11.

As indicated by FIG. 5, the 16 links of cable $cb00$ are distributed into four groups of four links, according to the value of digits $nb_{1/10}$. It is the same for the links of the other cables.

Moreover, the cable $cc00$ gathers the four groups of four links from the cables $cb00$ to $cb11$ characterized in that $nb_{1/0} = 00$.

Figure 6:
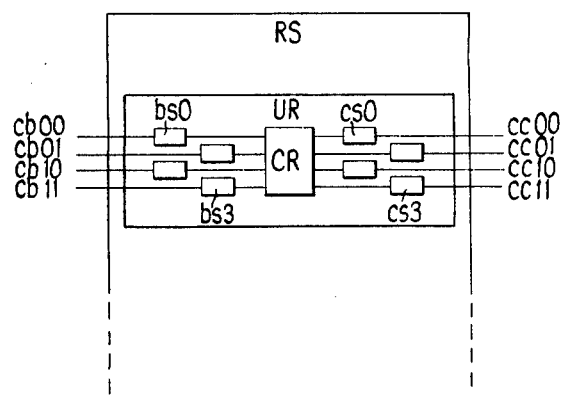
FIG. 6, an embodiment of a simplified distributing frame.

As indicated by FIG. 5, the links of cable $cc00$ consequently are originated from four different line selection units; their numbers include a common part $j$ and are differentiated by the value of digits $b_{1/0}$ and $l_{1/0}$, which duly corresponds to the 16-link grading groups that the equations of FIG. 6 table provide.

The cable $cc01$ is also constituted by the gathering of the links from outputs differentiated only by the digits $1_{1/0}$ and $b_{1/0}$; cables $cc10$ and $cc11$ not represented are constituted in the same way and finally the group of cables $cb00$ to $cb11$ is extended by the group of cables $cc00$ to $cc11$.

In the case of a network having 64 line selection units and 4 group selection units, $nb_{1/0} = g_{0/1}$. It is therefore seen in FIG. 5 that a cable $cb00$, originating from a line selection unit, has links connected to various group selection units at the rate of four links per group selection unit.

Therefore, in order to realize loop circuits, and by considering FIG. 5, instead of establishing a cable such as $cb00$, there will be provided connections (or straps) gathering two by two the links which normally constitute this cable. It then becomes quite easy to realize in as much loop circuits interconnecting the links belonging to one same group selection unit as loop circuits interconnecting links belonging to different group selection units.

FIG. 6 illustrates operaing means enabling the redistribution of line selection unit outputs achieved according to FIG. 5. A simplified distributing frame RS includes redistribution units such as UR. The redistribution unit UR comprises four connector blocks $bs0$ to $bs3$, four connector blocks $cs0$ to $cs3$, as well as a redistribution wiring CR. The cables $cb00$ to $cb11$ are plugged into the connector blocks $bs0$ to $bs3$, while cables $cc00$ to $cc11$ are plugged into the connector blocks $cs0$ to $cs3$. The redistribution wiring CR establishes exactly the connections between the cables as illustrated by FIG. 5.

The simplified distributing frame RS will have as many redistribution units such as UR as there are sets of four provisional groups of outputs; that is, according to the described example, a unit per 64 links. All these units will be identical. Consequently, the simplified distributing frame RS can be entirely manufactured at the factory in an economical way and the installation of the wiring between stages B and C of the switching network will be limited to the placing of the plug-in removable cables.

Moreover, the equations of the table in FIG. 4 enable conceiving the way to realize the loop circuits. Indeed, according to present invention, a loop circuit will interconnect two links belonging to one same provisional grouping. These links could have numbers differing only by one or two digits which may or may not be the one or the several digits defining the numbers of the group selection units or blocks. In the case of a half GSU network (that is to say 4 blocks), a loop circuit will connect, for instance, links whose numbers differ by the value of digit $bg_1$. This digit defines (with digit $bg_0$) a selection block. The loop circuit thus realized will enable therefore connecting two links from two different blocks. In the case of a one GSU network (16LSU), the same result is obtained in the same manner. In the case of a two GSU network (32 LSU), the connection of two links originating from two GSU is achieved by connecting links whose numbers differ by the value of digit $g_0$ identifying the two GSU. But, in addition to loop circuits which connect links between two GSU, there are also provided, for each GSU, loop circuits which connect links originating from the GSU and differing, same as mentioned above, by the value of digit $bg_1$. Finally, in the case of a four GSU (64LSU) network, links will be interconnected, being differentiated by the value of digits $g_0$ and $g_1$; this will enable obtaining loop circuits connecting two by two the group selection units. As mentioned above, there will also be provided, for each GSU, loop circuits which connect links originating from the GSU and which differ by the value of digit $bg_1$.

Realization of these loop circuits can be achieved at the level of the line selection units, or, in a more simple manner, at the level of the connector blocks $bs_{0/3}$ of FIG. 6.

The loop circuits are then realized in the form of coonectors, provided with internal pre-wiring, and being plugged into the connector blocks $bs_{0/3}$ (FIG. 6).

Figure 7:
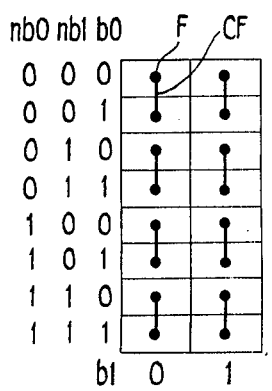
FIGS. 7, 8 and 9, examples of connectors used in the distributing frame of FIG. 6 for realizing the loop circuits in conformity with the equations of the table in FIG. 4.

FIG. 7 represents such a connector that can be used in all cases of networks. Each point such as F represents a link originating from the distribution circuit CR (FIG. 6). On the left part of the connector are indicated the values of the digits differentiaing the numbers of these links if they should lead differentiating a line selection unit. By realizing the loop circuits in the manner described above, these digits are digits $nb_1$, $nb_0$, $b_0$ and $b_1$. Each little stroke such as CF linking two points (links) represents a connection constituting a loop circuit. The addresses of two interconnected links differ by the values of their digits $b_0$, as can be judged when considering the digits indicated on the left of the connector. Since $b_0 = c_0$ (see FIG. 4), the loop circuits thus constituted enable interconnecting links belonging to different matrices of one same group selection unit.

Figure 8:
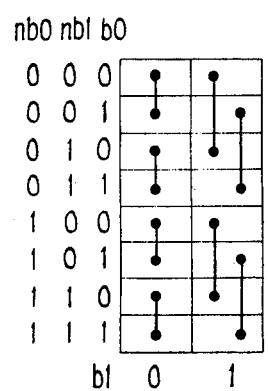

FIG. 8 represents a connector that can be used, namely, in a network with two or four group selection units. For the left half of the connector, each loop circuit associates, same as in the foregoing connector, two links whose numbers differ by the values of their digit $b_0$. Since $b_0 = c_0$, it therefore interconnects two links belonging to one same group selection unit as above. For the right half of the connector, a loop circuit interconnects two links whose numbers differ by the values of their digit $nb_1$ and therefore, since $nb_1 = bg_0$ or $g_0$ according to the type of network (see FIG. 4) two links which come from two different group selection units or blocks.

Figure 9:
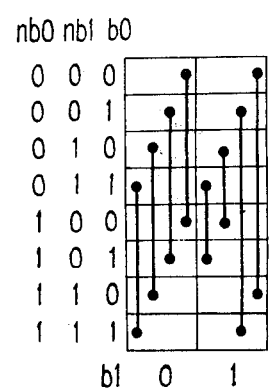

FIG. 9 represents a connector that can be used, namely, in a network with four group selection units. For the half left of the connector, each loop circuit interconnects two links whose numbers differ by the values of their digits $nb_0$, that is to say two links originating from two different group selection units if there are four of them. In the other half of the connector, each loop circuit interconnects two links whose numbers differ by the values of their digits $nb_0$ and $nb_1$; that is to say, since $nb_0 = c_3$, $bg_2$ or $g_1$ and $nb_1 = bg_0$ or $g_0$, two links originating also from two different group selection units, when there are several of them.

In the case of a network with four group selection units, for instance, the connectors in FIGS. 8 and 9 will be used in equal numbers to achieve the required loop circuits. As can be seen on the equations of lines 0 and 4 in the table of FIG. 4, the digit $nb_0$ is equal to the digit $g_1$ and the digit $nb_1$ to the digit $g_0$. The left half of the connector in FIG. 8 enables therefore constituting four loop circuits interconnecting, each, two links belonging to one same group selection unit whose number will be in succession: $g_1g_0 = nb_0nb_1 = 00, 01, 10, 11$. The other half of the connector enables constituting two loop circuits which interconnect links belonging to two group selection units of numbers $g_1g_0 = 00$ and $g_1g_0 = 01$ respectively; and two loop circuits which interconnect links belonging to two other group selection units of numbers $g_1g_0 = 11$ respectively. The left half of the connector in FIG. 9 will enable constituting two loop circuits which will connect links belonging to the two group selection units of numbers $g_1g_0 = 00$ and $g_1g_0 = 10$ respectively; and two other between the group selection units of numbers $g_1g_0 = 01$ and $g_1g_0 = 11$ respectively. The other half of the connector enables constituting two loop circuits which interconnect links belonging to the two group selection units of numbers $g_1g_0 = 00$ respectively; and, two other which interconnect links belonging to the group selection units of numbers $g_1g_0 = 01$ and $g_1g_0 = 10$ respectively. In utilizing one connector from FIG. 8 and one connector from FIG. 9 there is available, for each group selection unit, a loop circuit which interconnects two links connected to the inputs of this unit. Between the group selection units, taken two by two, there are two loop circuits connecting, each, a link from one unit to a link of the other unit.

It is seen therefore that in constituting groupings of links which lead onto the various group selection units and in connecting two by two the links of such a grouping by means of connectors provided with appropriate internal pre-wirings, loop circuits are realized. According to the connector utilized, links are being looped originating from one same group selection unit or from various group selection units.

The use of such connectors facilitates achieving extensions of the network in enabling replacement of one or several pre-wired connectors by connectors of another type, and this without any other modification of the distributing frame. Moroever, the quantity and the type of pre-wired connectors can be easily adapted to the total volume of the traffic and to its distribution on the GSU's.

It will be noted that in the above described applications and embodiment of the present invention, all the equipment have a binary configuration, the matrices having $16 = 2^4$ outputs or inputs, the numbers of matrices, the selection units and blocks being also powers of 2. Such a configuration is justified by the fact that the control functions of most of the latest exchanges depend upon a central unit assimilated to a digital computer processing binary data.

Nevertheless, the invention would remain applicable whatever the equipment configuration is, as far as relations of the type of those of FIGS. 4 and 6 may be established.

It is obvious that the preceding descriptions have only been given by way of non-restricted example and that numerous alternatives may be considered without departing from the scope of the invention. All the numerical precisions have only been given in order to facilitate the descriptions and may vary with each application.

What is claimed is:

1. A multiple-stage automatic switching network in which each stage of the network comprises a plurality of matrices comprised of intersecting input and output conductors, and in which the network includes a multiple-stage line selection unit at one end of the network and a multiple-stage group selection unit at the other end thereof, an intermediate distributing frame for interconnection of output conductors of the final stage of said line unit and the input conductors of the first stage of said group selection unit, a first plurality of links across said distributing frame, said links being individually disposed between an output conductor of the final stage of said line unit and an input conductor of the first stage of said group selection unit for the processing of calls serially through the stages of said network, a plurality of loop circuits at said frame, each said loop circuit having connection through terminals at said intermediate distributing frame to two input conductors of the first stage of said group selection unit for the return of calls serially transmitted from the output conductors of the final stage of said group selection unit serially doubled back through the stages of said group selection unit, with said links and said loop circuits interspersed on said distributing frame.

2. A network as claimed in claim 1, in which input conductors from said group unit are graded in a pattern at said frame, and said pattern includes connections to links to said line unit and loop circuits to other group unit inputs.

3. A network as claimed in claim 2, in which said group input conductors are grouped in cables and in which each cable includes connections to links or to loop circuits.

4. A network as claimed in claim 3, in which the conductors in a cable are each individually marked with addresses representing conductors and groupings of conductors in a stage of said network.

* * * * *